United States Patent [19]
Narang

[11] Patent Number: 5,970,715
[45] Date of Patent: Oct. 26, 1999

[54] FUEL/AIR MIXING DEVICE FOR JET ENGINES

[75] Inventor: Balbir S. Narang, Spring Valley, Calif.

[73] Assignee: San Diego State University Foundation, San Diego, Calif.

[21] Appl. No.: 09/049,717

[22] Filed: Mar. 26, 1998

Related U.S. Application Data

[60] Provisional application No. 60/041,383, Mar. 26, 1997.

[51] Int. Cl.[6] ........................................ F02C 7/22
[52] U.S. Cl. .................................. 60/726; 60/737
[58] Field of Search .............................. 60/726, 728, 737, 60/740; 137/15.1

[56] References Cited

U.S. PATENT DOCUMENTS

| | | | |
|---|---|---|---|
| 1,998,784 | 4/1935 | Mock | 60/728 |
| 2,671,314 | 3/1954 | Lichty | 60/39.02 |
| 2,679,137 | 5/1954 | Probert | 60/737 |
| 3,309,866 | 3/1967 | Kydd | 60/39.02 |
| 3,313,103 | 4/1967 | Johnson | 60/39.06 |
| 3,740,948 | 6/1973 | Kellett | 60/726 |

*Primary Examiner*—L. J. Casaregola
*Attorney, Agent, or Firm*—Fish & Richardson P.C.

[57] ABSTRACT

This invention is directed to a wavy air-foil structure effective to pre-mix liquid fuel and air prior to ingestion into a gas turbine engine. The structure is a surface or boundary generally in the form of a linear combination of sinusoidals, and over which the incoming air is caused to flow at very near sonic speed. This invention is based on a new phenomenon observed in a study of small-perturbation theory of gas dynamics.

4 Claims, 14 Drawing Sheets

| $x_2$ cm | upstream Mach number | downstream Mach number | difference in Mach number |
|---|---|---|---|
| | $M_\infty = 0.70$, T.P.=0.3281 | | |
| 0. | 0.718 | 0.712 | 0.006 |
| -0.03175 | 0.689 | 0.681 | 0.008 |
| -0.0635 | 0.670 | 0.662 | 0.008 |
| -0.09525 | 0.654 | 0.649 | 0.005 |
| -0.1270 | 0.640 | 0.634 | 0.004 |
| -0.15875 | 0.638 | | |
| | $M_\infty = 0.75$, T.P.=0.474 | | |
| 0. | 0.773 | 0.7650 | 0.008 |
| -0.03175 | 0.740 | 0.729 | 0.011 |
| -0.0635 | 0.715 | 0.704 | 0.011 |
| -0.09525 | 0.704 | 0.696 | 0.008 |
| -0.1270 | 0.687 | 0.680 | 0.007 |
| -0.15875 | 0.686 | | |
| | $M_\infty = 0.80$, T.P.=0.723 | | |
| 0. | 0.815 | 0.80 | 0.015 |
| -0.03175 | 0.774 | 0.760 | 0.014 |
| -0.0635 | 0.757 | 0.742 | 0.015 |
| -0.09525 | 0.731 | 0.721 | 0.010 |
| -0.1270 | 0.711 | 0.705 | 0.006 |
| -0.15875 | 0.716 | | |
| | $M_\infty = 0.84$, T.P.=1.0858 | | |
| 0. | 0.854 | 0.843 | 0.011 |
| -0.03175 | 0.830 | 0.817 | 0.013 |
| -0.0635 | 0.792 | 0.782 | 0.010 |
| -0.09525 | 0.778 | 0.764 | 0.014 |
| -0.1270 | 0.770 | 0.764 | 0.006 |
| -0.15875 | 0.755 | | |
| | $M_\infty = 0.945$, T.P.=6.224 | | |
| 0. | 0.952 | 0.937 | 0.015 |
| -0.03175 | 0.934 | 0.882 | 0.052 |
| -0.0635 | 0.895 | 0.855 | 0.040 |
| -0.09525 | 0.895 | 0.839 | 0.056 |
| -0.1270 | 0.839 | 0.831 | 0.008 |
| -0.15875 | 0.855 | | |

*FIG. 3*

FUEL/AIR MIXING DEVICE FOR JET ENGINES

This application claims the benefits of provisional application No. 60/041,383 filed Mar. 26, 1997.

BACKGROUND

Jet aircraft have become the most widely accepted form of commercial air transportation. These planes, except for the SSTs, generally fly at speeds of one-half to three-fourths the speed of sound. The gas turbine engines used to propel these planes produce large quantities of unburned hydrocarbons and suffer in performance because of their failure to utilize the energy available in this unburned fuel. This effect is due in part to the incomplete combustion of the liquid fuel, which in turn, is partly due to inadequate pre-mixing of fuel and air prior to combustion.

This problem has long been recognized, and a number of approaches and structural changes have been made to improve the premixing of fuel and air. Examples of such structures are shown in the following patents: U.S. Pat. No. 3,973,390 for a "Combustor Employing Serially Staged Pilot Combustion, Fuel Vaporization and Primary Combustion Zones"; U.S. Pat. No. 4,478,045 for a "Combustors and Gas Turbine Engines Employing Same"; U.S. Pat. No. 4,854,127 for a "Bimodal Swirler Injector for a Gas Turbine Combustor"; U.S. Pat. No. 4,938,020 for a "Low Cost Annular Combustor"; U.S. Pat. No. 5,265,425 for an "Aero-Slinger Combustor"; U.S. Pat. No. 5,277,022 for a "Air Blast Fuel Injection System"; and U.S. Pat. No. 5,341,645 for a "Fuel/Oxidizer Premixing Combustion Chamber".

A basic theoretical analysis of the small-perturbation theory is to be found in Chapter 8 of the Elements of Gasdynamics by authors H. W. Liepmann and A. Roshko, John Wiley & Sons, Inc., 1957. This theory was modified by the inventor and led to the discovery of the new phenomenon utilized in the present invention. A more complete mathematical treatment of this new phenomenon is to be found in a recent paper by the inventor. The technical literature also shows that others have studied fluid flow over a sine wave boundary (Beauchamp, Philip and Murman, Earl M., "Wavy Wall Solutions of the Euler Equations", AIAA Journal, vol. 24, no. 12 (1986), and Chang, Keun-Shik and Kwon, O. J., "Mixed Transonic Flow Over a Wavy Wall with Embedded Shock Waves", Transaction of the Japan Society for Aeronautical and Space Sciences, vol. 25, no. 70 (Feb. 1983). These studies failed to show any evidence of the phenomenon discovered by the inventor and utilized, at least partially, in the present invention.

For complete combustion, it is desirable to have the mixing of air and fuel reduced almost to the molecular level. This is difficult to attain in a jet engine because of the high velocity of the air passing through, and the very brief time available for mixing. The experimental study and invention described herein show that by utilizing this newly discovered application of a small-perturbation theory of gases, the mixing of liquid fuel and air prior to combustion may be greatly improved.

SUMMARY

The details of one or more embodiments of the invention are set forth in the accompanying drawings and the description below. Other features, objects, and advantages of the invention will be apparent from the description and drawings, and from the claims.

The present invention provides an improved air-foil structure adapted to be mounted at the air inlet of a jet engine which greatly improves the pre-mixing of liquid fuel and air prior to combustion. The structure is in the form of a hollow cylindrical drum mounted within the inner air-foil surface of the engine. The drum is formed with an outer wavy air-foil surface which opposes the existing engine inner air-foil surface, and means are provided for introducing liquid fuel into the air stream between the surfaces. The leading edge of the cylindrical drum is tapered at its inlet to form a Venturi structure with the inner air-foil of the engine.

This structure is effective to cause improved mixing when the velocity of air through the Venturi is near sonic speed (but below a Mach value of one), which would be generated at the normal cruising speed of the aircraft. This invention is not intended to be operative during take-offs and landings, or when the speed of the aircraft is substantially less than its normal cruising speed, unless auxiliary means are provided to increase the velocity of air through the Venturi.

DESCRIPTION OF DRAWINGS

FIG. 3 is a Table of the experimental mach number distribution in concavity.

Like reference numbers and designations in the various drawings indicate like elements.

DETAILED DESCRIPTION

The improved fuel-air mixing device of the present invention is shown in the figures in schematic form only for purposes of illustration, and like characters of reference designate like parts in the several views. It is to be understood that the dimensions and locations of the parts are not intended to be precise, and that the dimensions of the wavy surface are, in fact, exaggerated herein.

Figure 1:
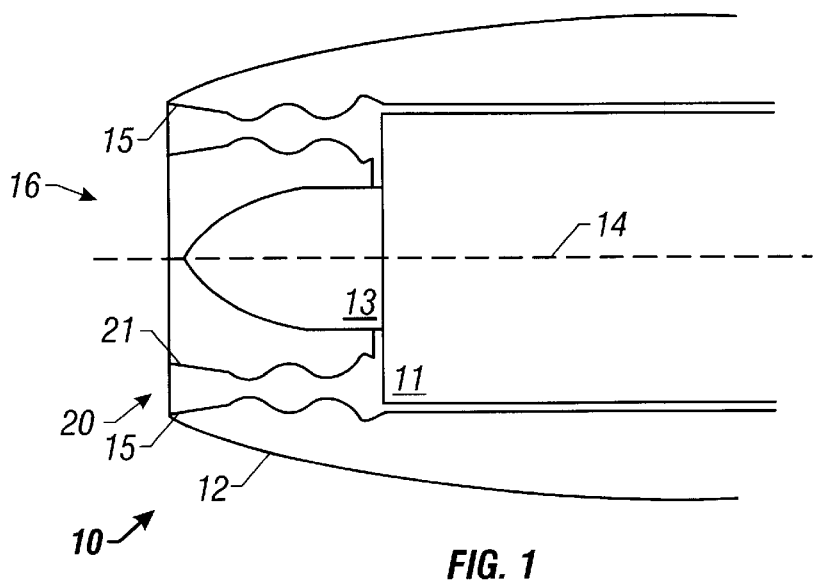
FIG. 1 is a schematic cross-sectional drawing of a gas turbine engine showing the air-foil structure of the present invention mounted in the air inlet of the engine.

In FIG. 1, a gas turbine engine 10 is shown schematically and includes an internal turbine 11, and an outer cylindrical housing or cowling 12. The turbine 11 has a tapered conical nose 13 and a longitudinal axis 14 which is also the central axis of the housing 12. The housing 12 is formed with a tapered internal cylindrical wall 15 which defines an air inlet 16 to the turbine 11. The fuel/air mixing device 20 of the present invention is shown as mounted within the inlet 16 adjacent the wall 15.

Figure 2:
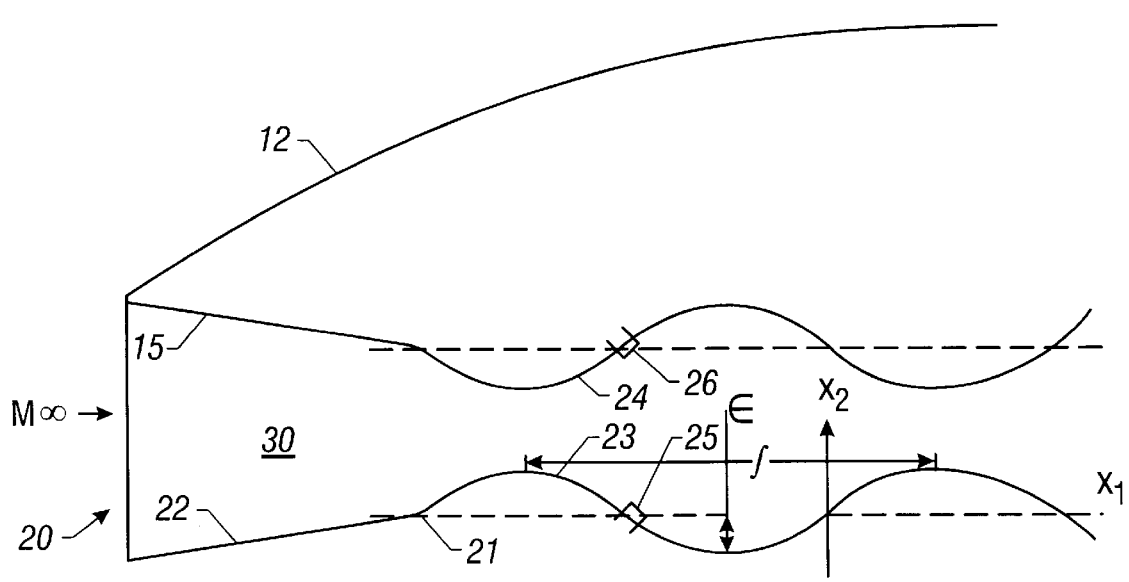
FIG. 2 is an enlarged view of the air-foil structure of FIG. 1.

Referring to FIG. 2, there is illustrated an enlarged cross-sectional view of a portion of the mixing device 20. The device 20 is in the form of a hollow cylindrical drum 21 and its axis is concentric with the axis 14. The drum 21 is formed with a flared inlet surface 22 and a wavy sinusoidal outer surface 23 throughout its axial length. The inner surface 15 is shown as being formed with a corresponding sinusoidal surface 24. The opposed surfaces 23 and 24 define a Venturi structure 30 between the surfaces. Fuel injectors 25 and 26 may be positioned to inject liquid fuel into the air stream between surfaces 23 and 24.

It is to be understood that if the device 20 is installed in an existing engine, the surface 15 could be smooth as originally constructed. The second wavy structure 24 can further improve the mixing of fuel and air, but its presence is not essential, as will be described hereinafter.

The operation and advantages of the present invention, and the experimental data, can be best understood by referring to the terms and definitions set forth in the Elements of Gasdynamics reference.

By definition, with a uniform free stream velocity U, and the velocity of sound as $a_\infty$, the free stream Mach number is $U/a_\infty = M_\infty$. As shown in FIG. 2, $x_1$ is the linear coordinate in the axial direction of flow, and $x_2$ is the transverse coordinate. The axial perturbation velocity along $x_1$ is given as u, and the transverse perturbation velocity along $x_2$ is given as v. The transonic parameter (T.P.) is defined as:

$$T.P. = M_\infty(\gamma+1)\epsilon\alpha/(1-M^2_\infty)^{3/2}$$

where $M_\infty$=free stream Mach number at the entrance to the sine boundary, $\gamma$=ratio of specific heats, $\epsilon$=boundary amplitude, and $\alpha = 2\pi$/boundary wave length. The perturbation velocities u and v are derived from the theoretical solutions of the linear and non linear differential equations. Linear solutions are given in Liepmann and Roshko, but non-linear solutions were obtained utilizing the new method developed by the inventor, which led to the discovery of this new perturbation phenomenon. This method is described below in connection with FIGS. 10–15. Experimental results are set forth in the graphs of FIGS. 4 through 15, along with the experimental data obtained from studies done in a supersonic wind tunnel.

In the experimental apparatus for the wind tunnel experiments, the sine wave boundary was milled from an aluminum block of 25.4 cm×15.24 cm. The wavelength of the boundary was 9.8167 cm with an amplitude of 0.160 cm. The length of the sine boundary consisted of 3 half wavelengths. Thirty-one equally spaced holes (0.889 mm diameter, 3.27 mm spacing) were drilled along the centerline of the boundary for pressure taps. In addition one hole was drilled 4.9149 cm forward of the sine boundary for a pressure tap to determine $M_\infty$ and another hole was drilled trailing the boundary by 1.6921 cm to determine the exit Mach number.

Figure 6:
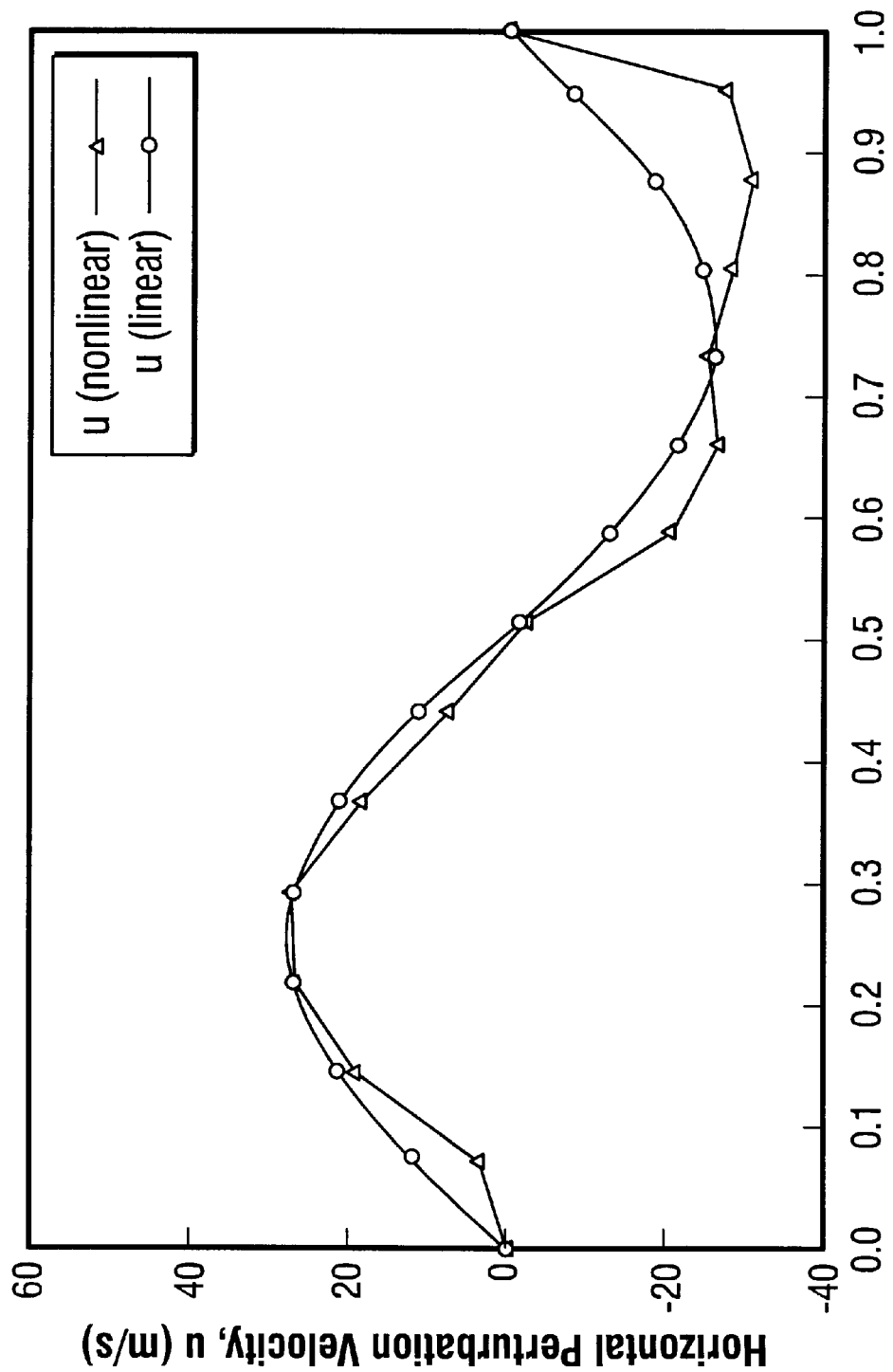
FIG. 6 is a plot of the local horizontal perturbation velocity v. horizontal distance at T.P.=4.596.
Figure 7:
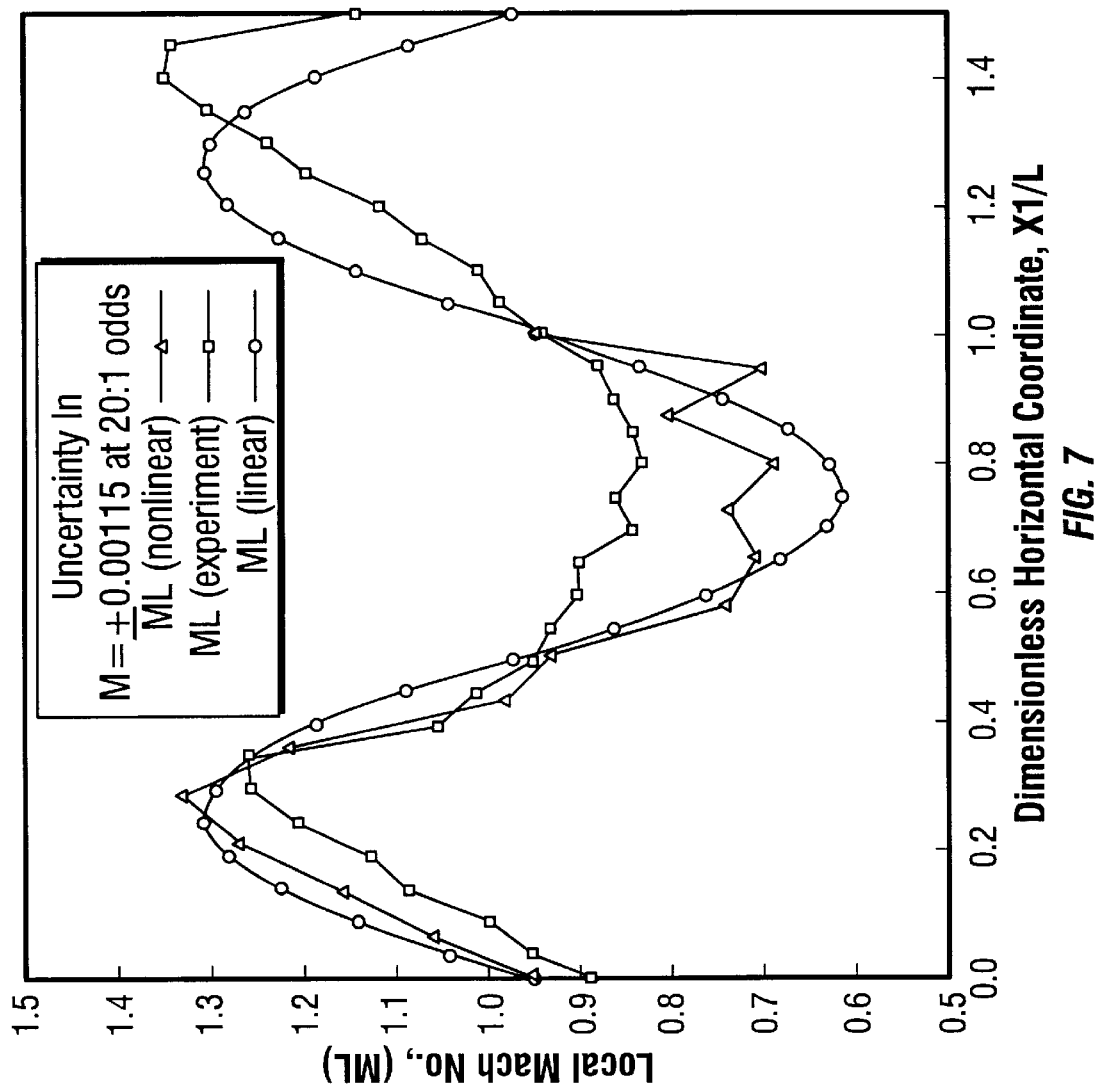
FIG. 7 is a plot of the local mach no. v. horizontal distance at T.P.=6.224.
Figure 8:
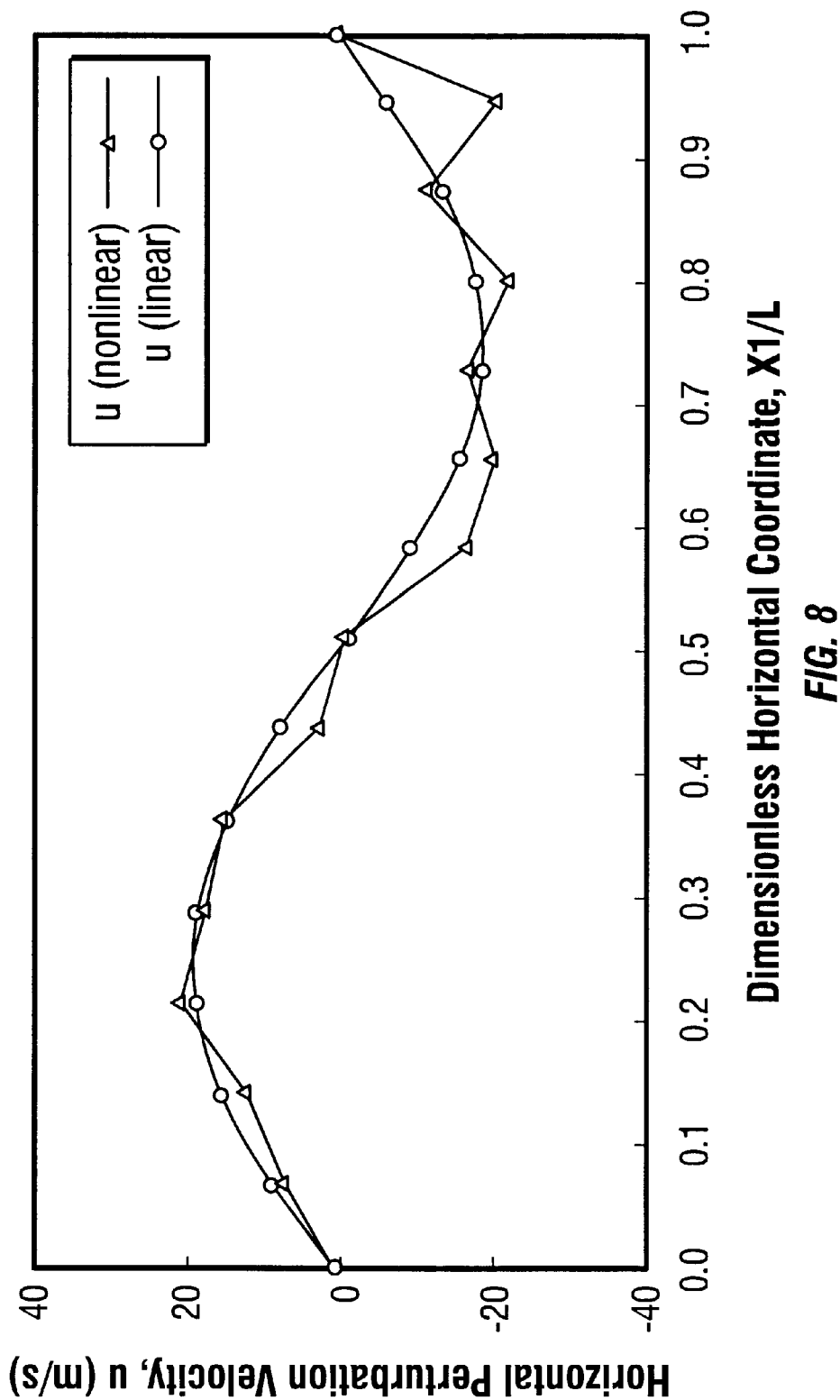
FIG. 8 is a plot of the local horizontal perturbation velocity v. horizontal distance at T.P.=6.581.
Figure 9:
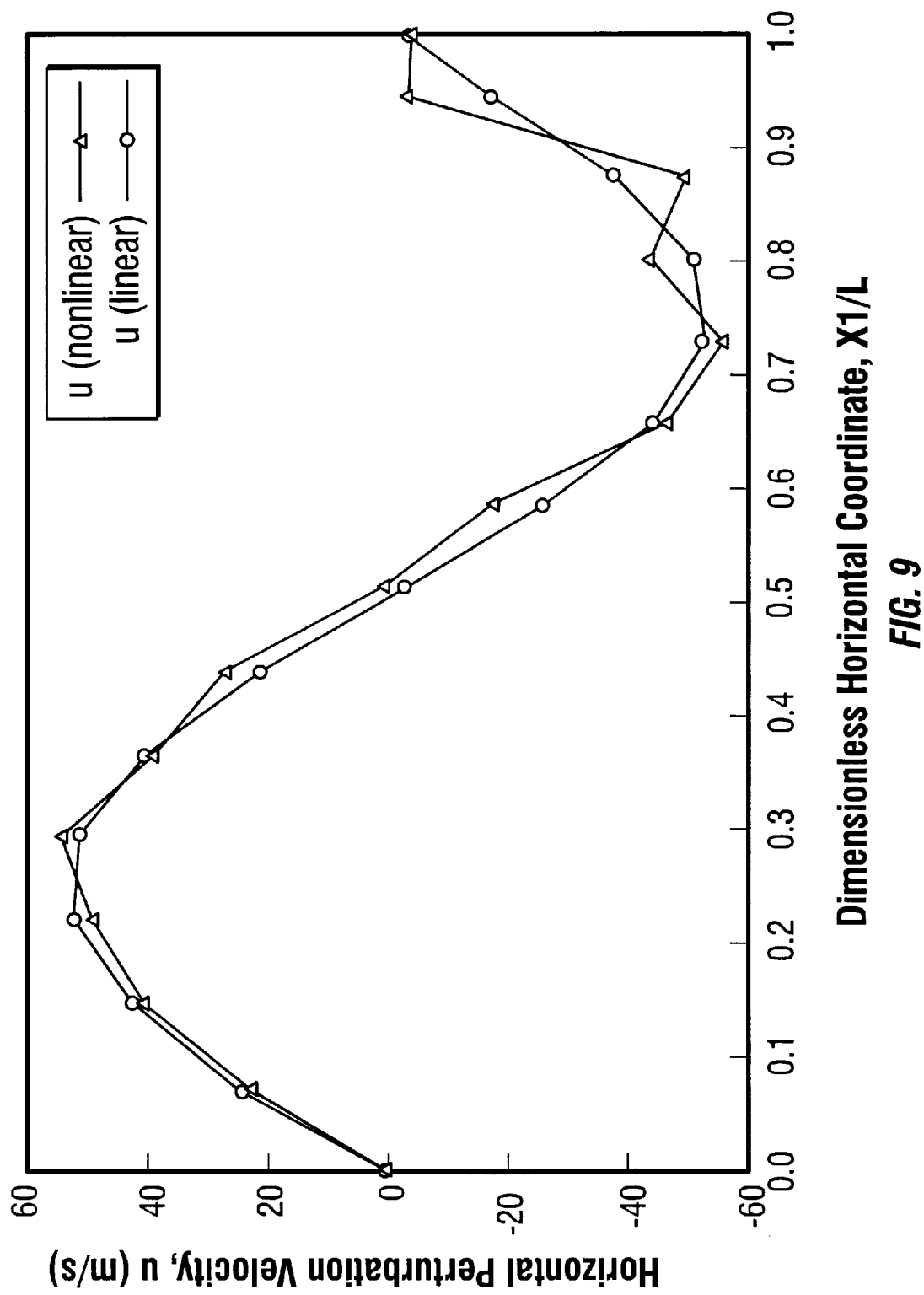
FIG. 9 is a plot of the local horizontal perturbation velocity v. horizontal distance at T.P.=18.427.

The data listed in the Table of FIG. 3 is plotted in the graphs of FIGS. 4–9, along with the linear and nonlinear solutions of the differential equations. It can be observed in FIGS. 4 and 5 that there is a close correlation between the linear (circles) and nonlinear (triangles) solutions when the T.P. is low. In FIG. 6, at T.P.=4.596, there is shown the beginnings of a significant departure of the nonlinear (triangles) from the linear (circles) solutions. This departure in solutions is even more apparent in FIG. 7 at T.P.=6.224, and the measured fluctuations in the experimental local mach numbers appear as well. The fluctuations in the nonlinear solution are also apparent in FIGS. 8 and 9 at values of T.P. greater than 6.5.

The fluctuations in the perturbation velocities determined experimentally as well as theoretically indicate that the combustion efficiency of jet aircraft can be improved significantly by enhancing the fuel/air mixing prior to combustion. In the structure shown in FIG. 2, the mixing takes place within the Venturi 30 to produce an enriched mixture which is then passed into the main combustion chamber of the turbine 11. The wavy air-foil surface might also be used to advantage by incorporation as a liner in the combustion chamber, or in the afterburner, or wherever enhanced mixing is desired. The drum 21 may also be movable axially, or made to be expandable, to vary the velocity of air through the Venturi 30. It may also be desirable to produce a change in phase between the surfaces 23 and 24 for further controlling the mixing.

The mixing phenomenon shown and described is predicted to persist almost undiminished in the transverse direction to the boundary when $M_\infty$ approaches a value equal to one. This is so because, according to linear theory, the axial perturbation velocity u contains an exponential term $\sqrt{1-M^2\infty}$, i.e., $u = U\epsilon\alpha\exp(-x_2\alpha\sqrt{1-M^2\infty})\sin\alpha x_1 \sqrt{1-M^2\infty}$), where U is the velocity at the entry to the Venturi, and $x_1$ and $x_2$ are axial and traverse coordinates, respectively. This would mean that if the fuel is introduced in air, at the beginning of the concavity, mixing of the fuel with air would take place all across the concavity cross-section, rather than only at the boundary.

The new method used to solve the transonic flow equation for flow over a wavy wall is now described. The results obtained are compared with those obtained from wind tunnel experiments. A new fluctuating flow phenomenon has been observed both in the experiment and in numerical calculations which enhance flow mixing. The numerical results indicate that the flow becomes locally sonic for a transonic parameter value greater than 0.5, while experimental data indicate a value of 0.6363 for the transonic parameter. The classical value of transonic parameter has a value of one for the flow to become locally sonic.

The following nomenclature is employed:

$A_n$=arbitrary constants to be evaluated by the application of boundary conditions.

$a_\infty$=ambient speed of sound, 346.86 m/s $a_{i,n}$=arbitrary constants evaluated by setting coefficients of $A_iA_n$ equal to zero L=wavelength of the boundary

M=(N−1)/2+1

$M_\infty$=free stream Mach number

N=final value of n in the infinite series

T.P.=$-M^2_\infty(\gamma+1)\epsilon\alpha/(1-M^2_\infty)^{3/2}$ transonic parameter U=free stream velocity u=induced axial velocity perturbation in the $x_1$ direction v=induced velocity perturbation in the transverse flow direction $x_1$=horizontal boundary coordinate $x_1^1$, $x_1^2$, etc.=values of $x_1$ along the horizontal direction $x_2$=transverse boundary coordinate $x_2^1$, $x_2^2$, etc.=values of $x_2$ along the transverse boundary coordinate φ=velocity potential

α=2π/L $\alpha_n$=2πn/L

ε=amplitude of the wavy wall

β=$(1-M_\infty^2)^{1/2}$

The perturbation flow equation over an infinitely long wavy wall is solved here. A new method of solving non-linear partial differential equations is used which Narang has developed. This method was used to solve the complete Navier Stokes equations for viscous incompressible flow in order to study the entrance flow between parallel plates.

The equation is first linearized so that the exact solution of the linearized equation can be obtained. The exact solution thus obtained is then modified to yield the solution of the non-linear equation. Unlike small perturbation methods, the difference between the linear and non-linear solution of a given differential equation can be quite large. This can be proved to be true in the case of the solution of an ordinary non-linear differential equation, for example, y'$^2$−yx'+y=0. It is therefore desirable to formulate the solution in the framework of the new method. The solution obtained by the method discussed here can be reduced, as a special case, to that of the linearized partial differential equation. A particular limitation of this method of solution is that the boundary conditions used for obtaining the linear solution have also to be used without modifications, for obtaining the solution of the non-linear differential equation. In this case, the boundary condition for vertical velocity is applied at $x_2$=0 instead of at the actual boundary, as required by the linear solution.

The formulated solution can be reduced to the linear solution if the amplitudes of perturbation are sufficiently small so that the non-linear terms in the equation are approximately an order of magnitude smaller than the linear terms, as expected. The match of the solution (obtained from the presented mathematical formulation) with the linear solution is excellent for the case of small perturbations. For the case of large perturbations, the obtained solutions are quite different from linear solutions and exhibit a fluctuating behavior in the concavity of the boundary. The experimental work also shows a similar fluctuating pattern. This is the first time that such behavior has been observed either numerically or experimentally. Both Beauchamp and Chang studied flow over the sine boundary but their numerical solutions do not exhibit this observed fluctuating flow behavior.

Mathematical Formulation

A two-dimensional compressible, inviscid and irrotational perturbation flow is represented by the linear differential equation:

$$(1-M^2\infty)\frac{\partial^2 \phi}{\partial \chi_1^2} + \frac{\partial^2 \phi}{\partial \chi_2^2} = 0 \qquad (1)$$

where φ is the perturbation velocity potential and $$u = \frac{\partial \phi}{\partial \chi_1}$$

and $$v = \frac{\partial \phi}{\partial \chi_2}.$$

For a wavy wall boundary: $x_2$−ε sin α$x_1$=0 together with the linearized boundary condition:

$$v(x_1, 0) = \left(\frac{\partial \phi}{\partial x_2}\right)_{wall} = U\left(\frac{dx_2}{dx_1}\right)_{wall} = U\epsilon\alpha \cos(\alpha x_1) \qquad (2)$$

the solution of the above linear differential equation (1) is:

$$\phi_l = Ae^{-\alpha\beta x_2} \cos(\alpha x_1) \qquad (3)$$

where A=−Uε/β.

This solution is adequate as long a $M_\infty$ is small enough so that local sonic velocity is not reached anywhere in the flow. The non-linear perturbation equation of flow for high as well as low subsonic Mach numbers can be written as:

$$(1-M_\infty^2)\frac{\partial^2 \phi}{\partial x_1^2} + \frac{\partial^2 \phi}{\partial x_2^2} - M_\infty^2[(\gamma+1)/U]\frac{\partial \phi}{\partial x_1}\frac{\partial^2 \phi}{\partial x_1^2} = 0 \qquad (4)$$

This equation will be solved subject to the boundary conditions given by equation (2).

It is now assumed that the modified potential function, φ, satisfying equation (4) should include the linear solution as well as higher order harmonics along with a weighting function (factorial in the denominator) to accelerate convergence. It is expected that this function, φ, should express flow fields up to a maximum local Mach value of 1.3 as entropy increases for such flows can be neglected. Accordingly, the function φ is assumed to have the form:

$$\phi = \sum_{n=1}^{N} A_n \sum_{i=1}^{M} a_{1,n}[(f_n(x_1))^{2i-2}/(2i-2)!]e^{-\alpha\beta x_2}\cos(\alpha x_1) \qquad (5)$$

The requirement for convergence to a solution of the differential equation (4) dictated that $$f_n(x_1) = \sin(\alpha_n x_1) \text{ for } T.P. \leq 0.5 = \cos(\alpha_n x_1) \text{ for } T.P. > 0.5 \qquad (6)$$

This choice of $f_n(x_1)$ makes physical sense because, at lower values of T.P., the non-linear addition to the linear potential, $\phi_l$, in equation (3) should provide a contribution to $u_{linear}$ which is in phase with the boundary ($u_{linear}$ is in phase with the boundary) and vice versa for T.P.>0.5, providing for a transition to supersonic flow behavior (in which case $u_{linear}$ is out of phase with the boundary). This is unlike the solutions of the linearized differential equation where the flow is either subsonic or supersonic and where no transition from subsonic flow to supersonic flow can be provided.

The constants $A_n$ in equation (5) are arbitrary and these will be determined from the boundary conditions, just as the arbitrary constant A of equation (3) was determined from the boundary condition.

In order to obtain a convergent solution of the differential equation (4), it was found necessary that all the terms of equation (4) have the same order of non-linearity in the perturbation potential function, φ. This is accomplished by multiplying the linear terms by the function Z as defined below. Multiplication by the function Z also makes all the terms of equation (4) homogenous in coefficients $A_iA_n$.

$$Z = 1 = \left(\frac{\partial \phi}{\partial x_2}\right)_{wall} / (U\epsilon\alpha \cos(\alpha x_1)) \tag{5}$$

It can be seen from equation (2) that Z is equal to one. Z can now be written as:

The perturbation equation becomes:

$$Z = -[(1-M_\infty^2)^{1/2}/(U\epsilon)]\sum_{n=1}^{N} A_n \sum_{i=1}^{M} a_{i,n}(f_n(x_1))^{2i-2}/(2i-2)! \tag{7}$$

$$Z\left[(1-M_\infty^2)\frac{\partial^2 \phi}{\partial x_1^2} + \frac{\partial^2 \phi}{\partial x_2^2} - M_\infty^2[(\gamma+1)/U]\frac{\partial \phi}{\partial x_1}\frac{\partial^2 \phi}{\partial x_1^2}\right] = 0 \tag{8}$$

The substitution of the potential function of equation (5) in equation (8) yields an algebraic equation which is quadratic throughout in all unknown coefficients $a_{i,n}$.

The potential function, $\phi$, of equation (5) can be separated into two parts as indicated below in equation (9). The first part $\phi_l$ represents the solution of the linearized differential equation (1) and the second part represents the contribution to $\phi$ due to the non-linearity, viz:

$$\phi = \phi_l + \sum_{n=1}^{N} A'_n \sum_{i=l}^{M} a_{i,n}'[(f_n(x_1))^{2i-2}/(2i-2)!]e^{-\alpha\beta x_2}\cos(\alpha x_1) \tag{9}$$

The decomposition of $\phi$ into two parts above in equation (9) is obtained from equation (5) as follows. The coefficient $A_1$ $a_{1,1}$ (for i=1 and n=1) of the first term of the series in equation (5) can be decomposed into two parts:

$$A_1 a_{1,1} = A + (A_1 a_{1,1} - A) = A = A'_1 a'_{1,1}$$

where A, $A_1'$ and $a'_{1,1}$ are arbitrary constants. The first term of the series of equation (5) can now be written as:

$$Ae^{-\alpha\beta x_2}\cos(\alpha x_1) + A'_1 a'_{1,1} e^{-\alpha\beta x_2}\cos\alpha x_1$$

The series of equation (5) can now be written as equation (9). The first term in the above is $\phi_l$ of equation (3). The values of $A_n'$ and $a'_{1,n}$ are identically the same as those of $A_n$ and $a_{i,n}$ except when i=1 and n=1. The second part of $\phi$ of equation (9) decays with decreasing perturbations and grows with increasing perturbations.

Numerical Solution

The differential equation (5) may be solved for various T.P. values of 0.3281, 0.474, 0.5, 0.7225, 1.0858, 2.972, 4.596, 6.2241 and 18.427 (see Table 1 of FIG. 3) subject to the linearized boundary condition at the wall give by equation (2).

Determination of the Constants $a_{i,n}$

Substituting equations (5) and (7) in equation (8) yields the following algebraic equation:

$$\beta^2 e^{-\alpha\beta x_2}[-\beta/U\epsilon]\left\{\sum_{n=1}^{N} A_n \sum_{i=1}^{M} a_{i,n} f_n^{2i-2}/ \right. \tag{10}$$

$$(2i-2)!\right\}X\sum_{n=1}^{N} A_n 1\sum_{i=1}^{M}\{a_{i+1,n}[((f_n''f_n^{2i-1}/2i-1)!+$$

$$f_n'^2 f_n^{2i-2}/(2i-2)!)\cos(\alpha x_1) -$$

$$(2\alpha f_n' f_n^{2i-1}/(si-1)!)\sin(\alpha x_1)]\} - M_\infty^2((\gamma+1)/$$

$$U)e^{\alpha\beta x_2}\left\{\left[\sum_{n=1}^{N} A_n \sum_{i=1}^{M} (a_{i+1,n}f_n'f_n^{2i-1}/(2i-1)!)\cos(\alpha x_1) -\right.\right.$$

$$(a_{i,n}f_n^{2i-2}/(2i-$$

$$2)!)\sin(\alpha x_1)\right]X\left[\sum_{n=1}^{N} A_n \sum_{i=1}^{M}(a_{i+1,n}[(f_n''f_n^{2i-1}/$$

$$(2i-1)!)+$$

$$f_n'^2 f_n^{2i-2}/(2i-2)!)\cos(\alpha x_1) -$$

$$2\alpha(f_n'f_n^{2i-1}/(2i-1)!)\sin(\alpha x_1)\right] -$$

$$\left. a_{i,n}(\alpha^2 f_n^{2i-2}/(2i-2)!)(\cos\alpha x_1)\right\} = 0$$

where $f_n = f_n(x_1)$ and $$f_n' = \frac{df_n(x_1)}{dx_1}$$

The choice of N=15 and M=8 was found to be sufficient for obtaining convergent solutions. There were 120 equations with 120 unknown constants $a_{i,n}$. These constants $a_{i,n}$ also appear quadratically, i.e., $a_{1,1}^2$, $a_{1,1}$, $a_{1,2}$, etc. in equation (10). For the purpose of numerical calculation of the coefficients $a_{i,n}$, the flow field is divided into fifteen equal intervals. All the $\Delta x_1$ intervals were chosen to be equal in value as were the $\Delta x_2$ intervals. For numerical evaluation of the constants $a_{i,n}$, equation (10) can now be written as:

$$\begin{pmatrix} g_{1,1} & g_{1,2} & \cdots & g_{1,120} \\ \vdots & \vdots & \cdots & \vdots \\ g_{120,1} & g_{120,2} & \cdots & g_{120,120} \end{pmatrix} \begin{pmatrix} A_1 A_1 \\ A_1 A_2 \\ \cdots \\ A_{15} A_{15} \end{pmatrix} = 0 \tag{11}$$

where $g_{i,j}$ are the expressions containing the unknown quadratic combinations of $a_{i,j}$, for example, for a value of $x_1^1 = x_1$ and $x_2^1 = x_2$ the element $g_{1,1}$ is ($g_{1,1}$ is one of 120 elements of the coefficient $A_1 A_1$):

$$g_{1,1} = (-\beta^3 e^{-\alpha\beta x_2^1}/ \tag{12}$$

$$U\epsilon)(a_{1,1})\{a_{2,1}[(f_1 f_1'' + f_1'^2)\cos(\alpha x_1^1) - 2\alpha f_1' f_1'\sin(\alpha x_1^1)]\} -$$

$$(M_\infty^2(\gamma+1)e^{-2\alpha\beta x_2^1}/U)(a_{2,1}f_1' f_1\cos(\alpha x_1^1) -$$

$$a_{1,1}\alpha\sin(\alpha x_1^1))Xa_{2,1}[(f_1'' f_1 + f_1'^2\cos(\alpha x_1^1) -$$

$$2\alpha f_1' f_1\sin(\alpha x_1^1)] - a_{1,1}\alpha^2\cos((\alpha x_1^1)\}$$

Performing the matrix operation in equation (11) and rearrangement gives 120 distinctly different terms as shown below:

$$A_1 A_1 \left( \sum_{i=1}^{120} g_{i,1} \right) + A_1 A_2 \left( \sum_{i=1}^{120} g_{i,2} \right) + \ldots + A_{15} A_{15} \left( \sum_{i=1}^{120} g_{i,120} \right) = 0 \quad (13)$$

In equation (13) above, all of the 120 solution functions, $$\sum_{i=1}^{120} g_{i,1}, \sum_{i=1}^{120} g_{i,2},$$

etc., whose coefficients are the 120 distinct combinations of arbitrary constants $A_i A_j$, are independent of each other, and therefore are deemed to satisfy the differential equation (8) individually and are therefore set equal to zero. This situation is analogous to the case of a linear differential equation whose general solution is the summation of independent solution functions with each function multiplied by an arbitrary constant and whose each solution function satisfies the differential equation.

This system of 120 algebraic equations is solved by using the subroutine developed by Powell. Convergence to the final values of $a_{i,n}$ is obtained when the sum of the squares of the residuals of the equations has been minimized. In this analysis, these values ranged from between $10^{-10}$ and $10^{-12}$. The starting point of the solution required initial guesses for the values of $a_{i,n}$. These values were always assumed to be equal to one. Of course, other initial values may be employed as dictated by the process.

Determination of Coefficients $A_n$

At this stage, all of the $a_{i,n}$ values have been evaluated and the only unknowns in equation (5) are the arbitrary constants $A_n$. The coefficients $A_n$ are determined by making the perturbation potential, $\phi$, in equation (5) satisfy the boundary condition for transverse velocity at $x_2=0$ (the same as for the linear equation, give by equation (2)).

Experimental Facility

Experiments were carried out in a supersonic wind tunnel to validate numerical results. Nozzle blocks for Mach equal to one were used for the study. Four different runs were made to complete the dataset for a particular free stream Mach number.

Discussion

The uncertainty calculations for the values of experimental Mach number are based on the maximum difference in the values of the free stream Mach number determined while collecting data for the four groups and the corresponding pressure difference. The uncertainty is shown in each figure where relevant and is calculated at 20:1 odds (i.e., one can state with 95% certainty that the values of data lie within the ± limits indicated in each figure).

Figure 10:
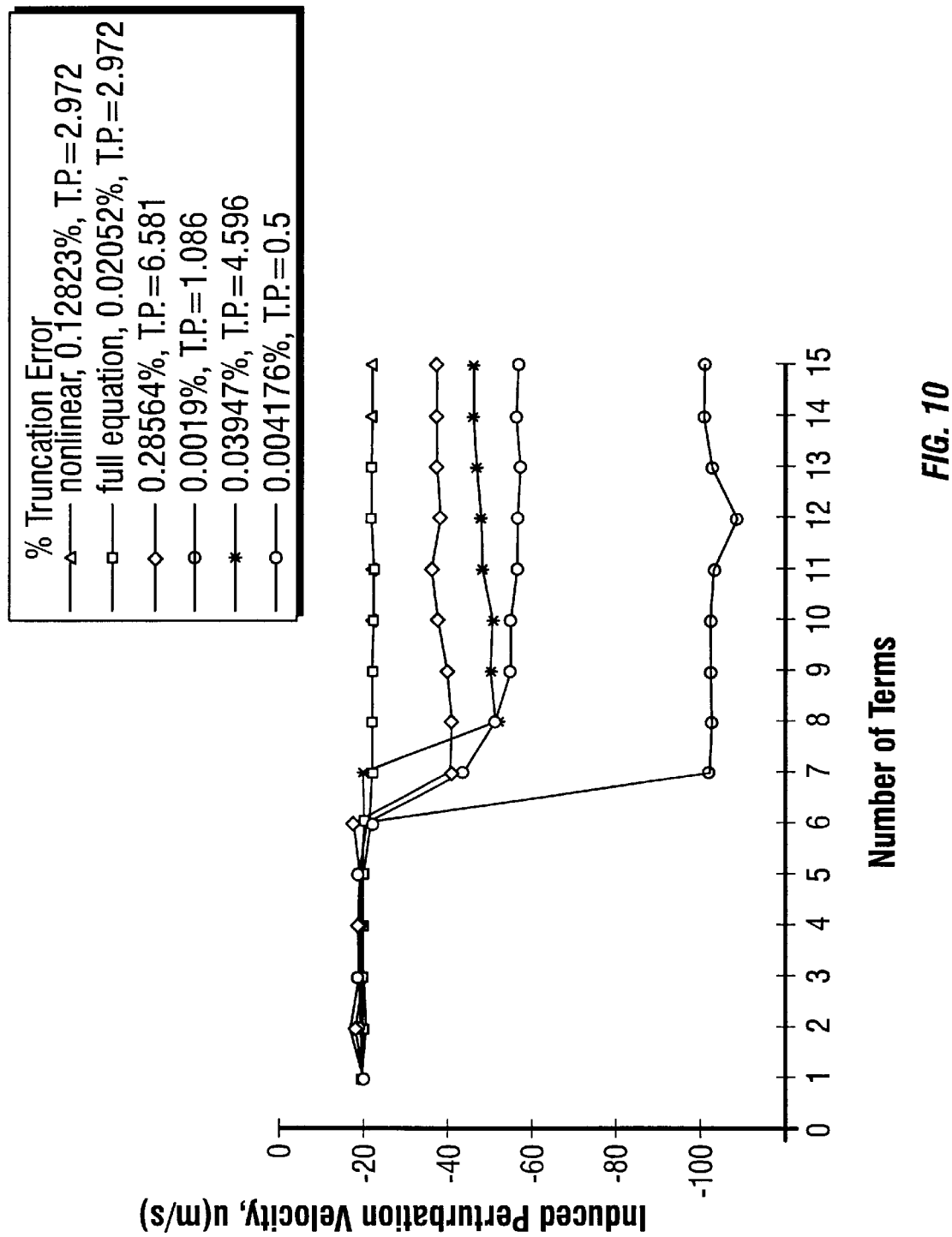
FIG. 10 is a plot of the perturbation velocity u v. number of terms considered for $x_1/L=0.7283$.

FIG. 10 shows the convergence behavior of the numerical solutions for various values of the transonic parameter. The graphs show the sum of the series for a particular value of n. For example, at n equal to 10, the graphs show the sum of the first ten terms of the series for a particular value of transonic parameter. An estimate of the truncation errors is also shown in the figure. This error is defined by:

$$\% \text{ truncation error} = \frac{\text{Value of the last term of series} - \text{average value of last two terms}}{\text{Average value of last two terms}} \times 100$$

Figure 11:
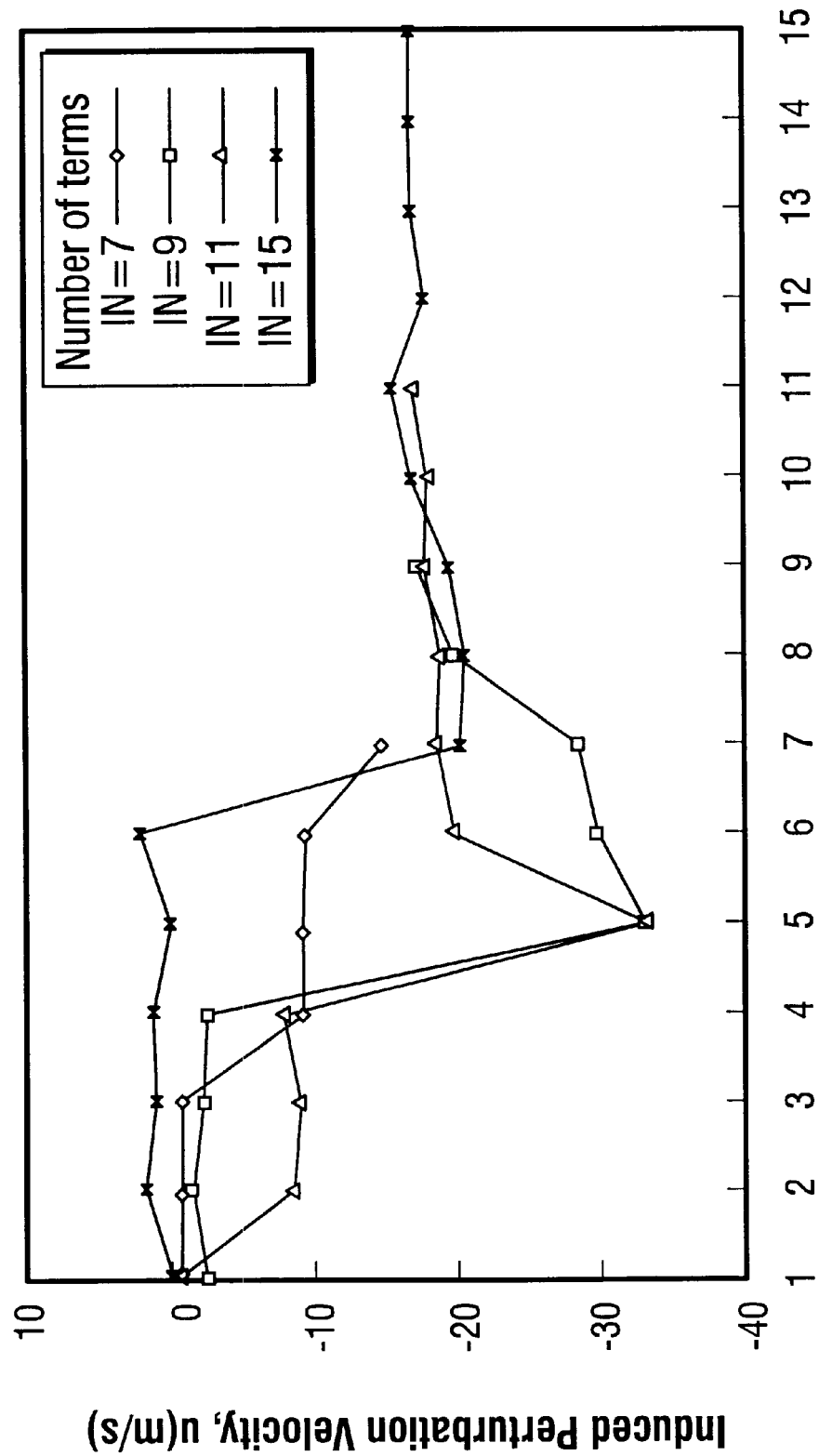
FIG. 11 is a plot of the perturbation velocity u v. number of terms considered for $x_1/L=0.7283$ and for T.P.=4.596.

For the purpose of numerical accuracy, two criteria were used for convergence to a solution, viz: the number of terms in the series and the sum of the least square error of the coefficients $a_{i,n}$. When a small number of terms was used, the sum of the series was typically affected by the contribution of the last term in the series as shown in FIG. 11 for T.P. equal to 4.596. However, with an increase in the number of terms of the series contribution, the last terms in the summation became less significant as seen in FIG. 1. The choice of N equal to 15 met this criteria for all the values of T.P. presented here. Also, final values of the coefficients $a_{i,n}$ were deemed to have been achieved when the sum of the least square error of these coefficients failed to decrease any further. This error was in the range of $10^{-10}$ to $10^{-12}$ for various values of T.P. The time for each run was 11–14 minutes of a Cray machine model C-90 X/Mp. The total Cray time was approximately 2 hours and 40 minutes.

Figure 12:
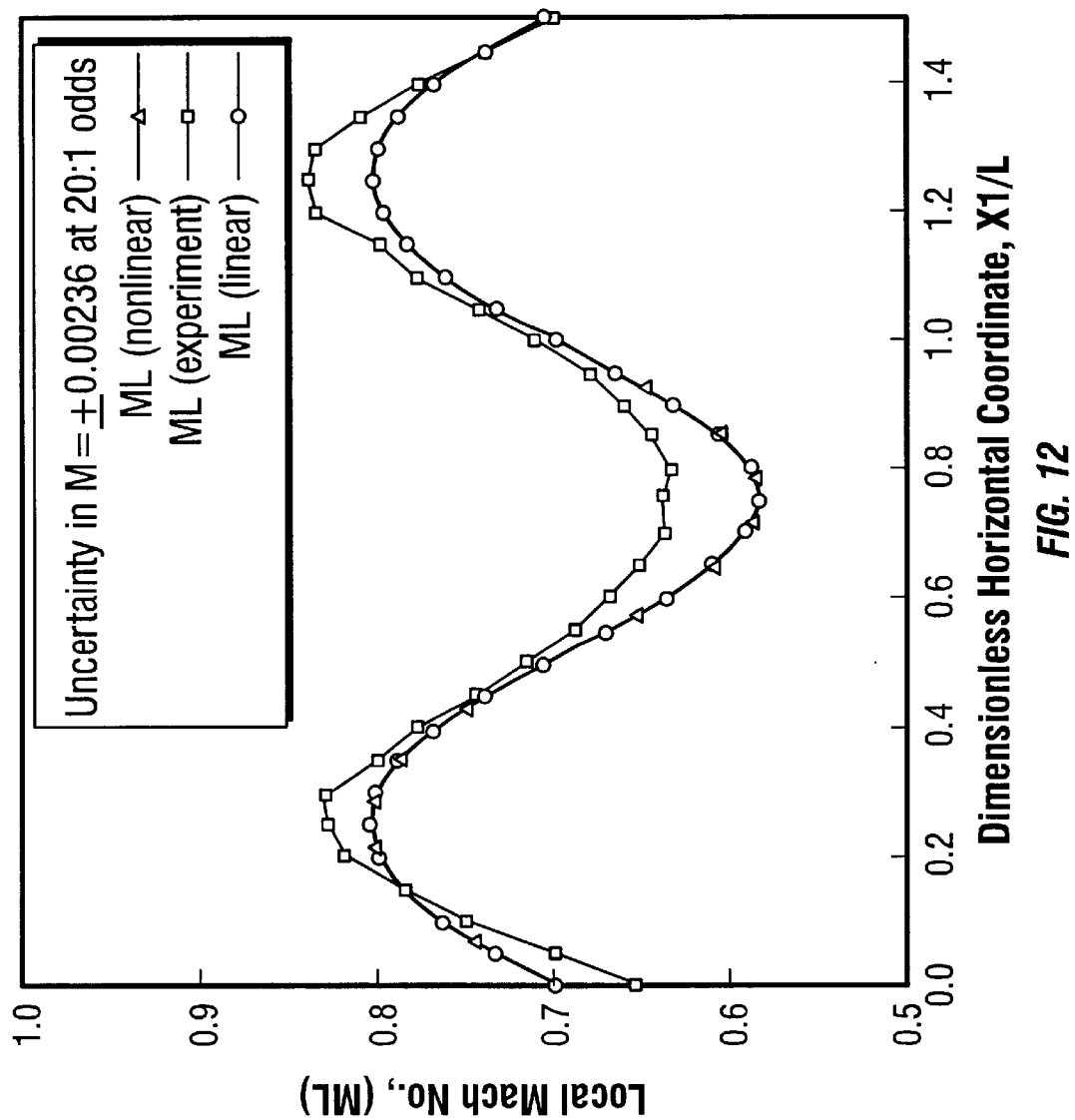
FIG. 12 is a plot of local horizontal perturbation velocity v. horizontal distance at T.P.=0.328.
Figure 13:
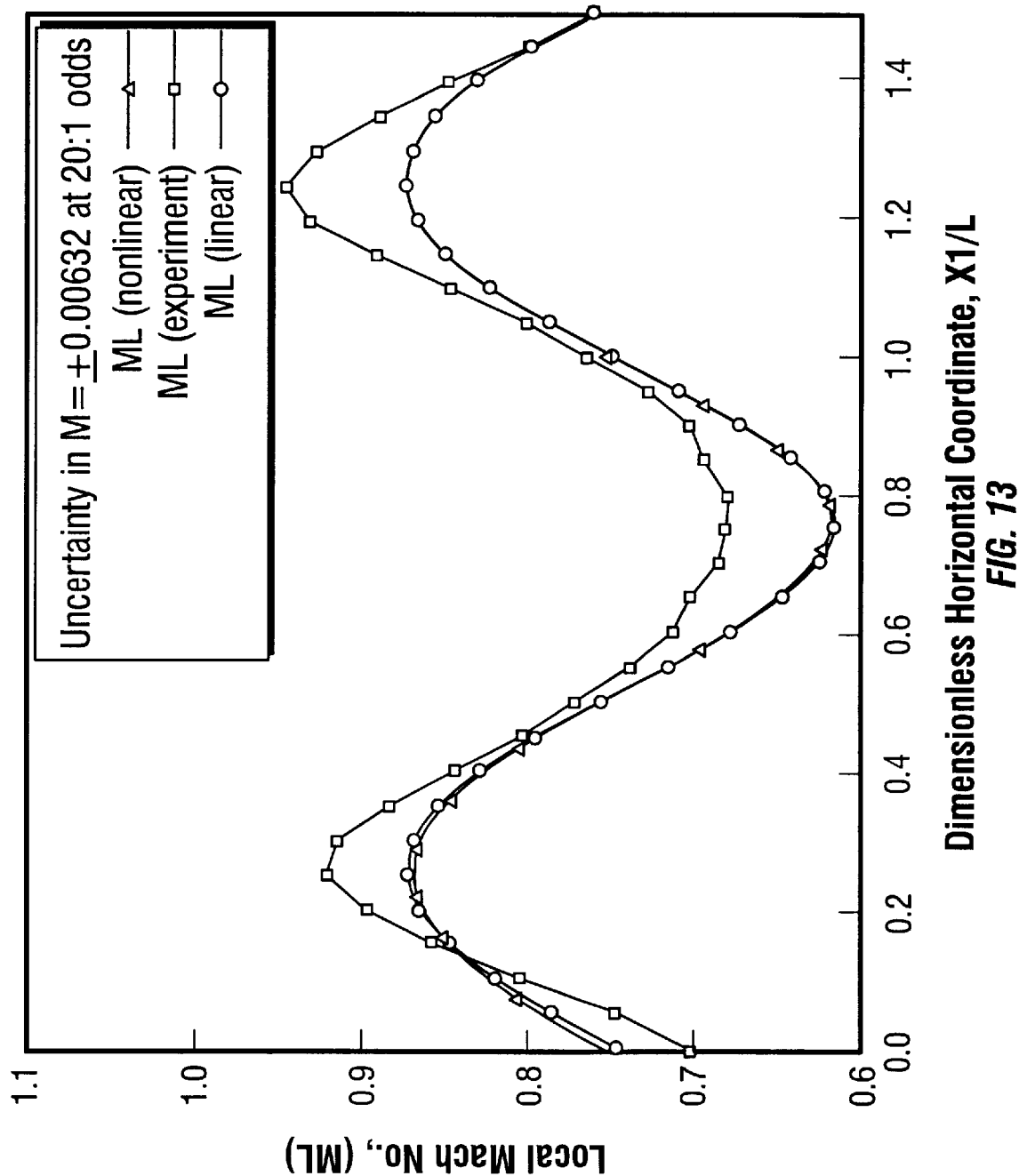
FIG. 13 is a plot of local horizontal perturbation velocity v. horizontal distance at T.P.=0.474.
Figure 14:
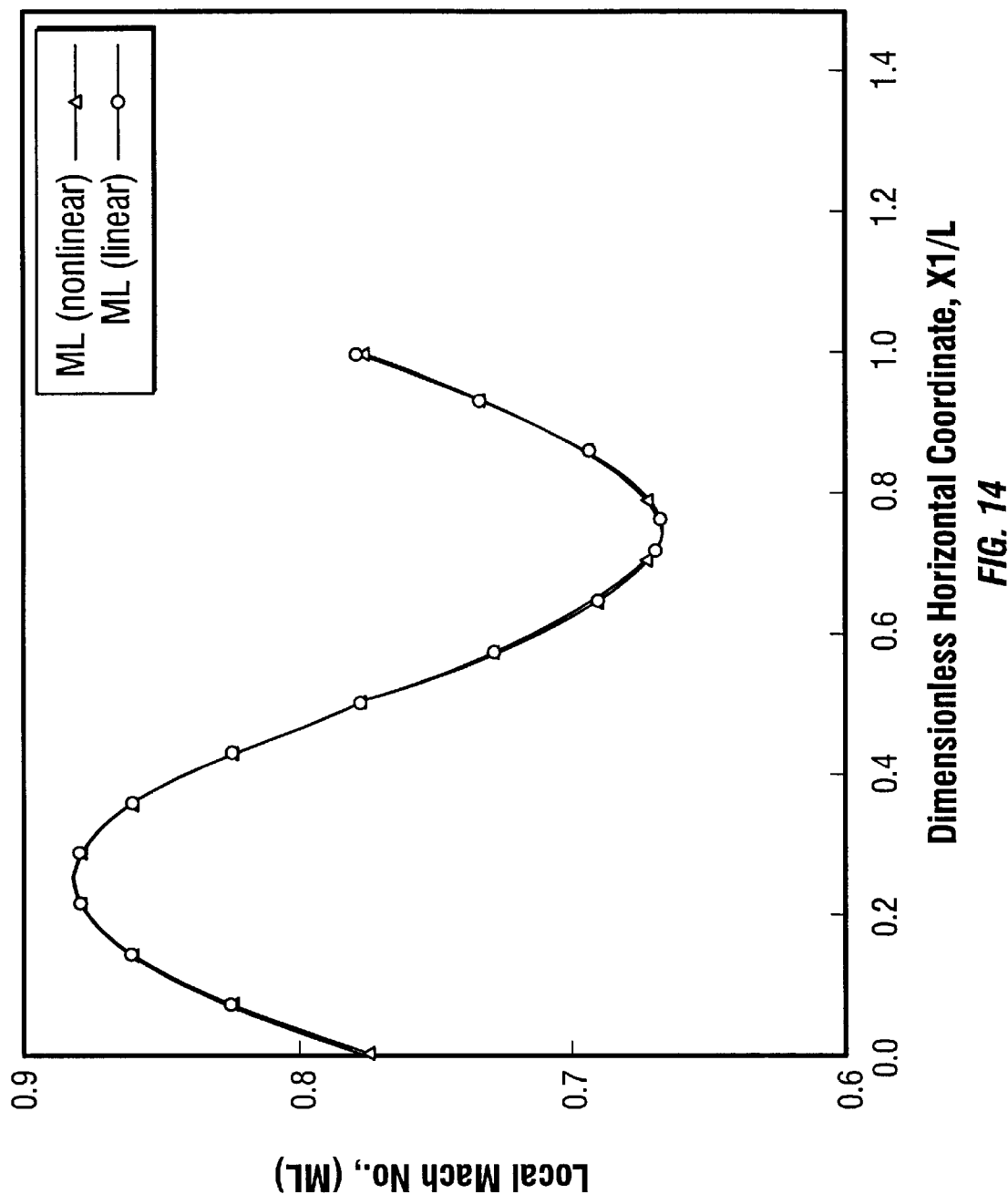
FIG. 14 is a plot of local horizontal perturbation velocity v. horizontal distance at T.P.=0.500.

FIGS. 12 through 14 show the values of local Mach numbers for increasing transonic parameters. FIG. 12 provides a linear check of the solution of equation (8) for the limiting case of a small value of the transonic parameter. Convergent solutions of equation (8), for transonic parameter values greater than 0.5, could not be obtained unless $f_n(x)$ was set equal to $\cos(\alpha_n x_1)$. The solution for the T.P. value of 0.5 is shown in FIG. 14. The present numerical procedure, therefore, suggests that local sonic Mach should be realized for values of T.P. equal to or greater than 0.5. This, however, does not occur until T.P. values equal to or greater than one are achieved as seen, e.g., in FIG. 4. One would also expect that the nonlinear solutions of equation (8) should begin to differ greatly from the linear solution for T.P. values greater than 0.5. The reason for this apparent anomaly is that the calculation of the values of $a_{i,n}$ from equation (13) satisfy the exact differential equation (8) but the evaluation of the coefficients $A_n$, for perturbation velocities, satisfy only the approximate boundary condition at $x_2$ equal to zero.

The flow would have become supersonic locally if it were possible to satisfy the boundary conditions at the actual boundary rather than at $x_2=0$. The experimental data of FIG. 4 does not lend credibility to this statement as a local maximum Mach value of 1.097 is obtained on the first crest of the boundary at T.P. equal to 0.7225. Experimental data of FIGS. 13 and 4 indicate that a local Mach value of one is achieved between T.P. values of 0.474 and 0.7225. In order to obtain an approximate experimental value of T.P. for the first local occurrence of sonic velocity on the first crest of the boundary, a quadratic interpolation relationship of the form given below was assumed:

$(M_1)_{max} = a + b(T.P.) + c(T.P.)^2$

Where a, b and c are arbitrary constants and $M_L$ is the local Mach number. Interpolation based on the above quadratic expression yielded a local sonic value of $(M_L)_{max}$ at T.P. equal to 0.5904. Linear interpolation for sonic flow of $(M_L)_{max}$ yielded a T.P. value of 0.5863.

Allowing for the growth of the boundary layer and using Prandtl's simple power law for turbulent displacement yields a T.P. value of $(M_L)_{max}$ for sonic flow equal to 0.6363 for quadratic interpolation and a value of 0.6286 for linear interpolation. From the experimental results, the value of T.P. for locally sonic flow would be smaller and, therefore, closer to 0.5 in the absence of leading edge effects which slow down the flow at the surface. There may be less leading edge effects at the second crest but it is not used for computing T.P. for sonic flow because the growth of the boundary layer is not precisely known. Also, even at the first crest, the T.P. value should be less than 0.6363 because the flow there is an accelerated flow while the flat plate flow estimate has been used for boundary layer thickness. The value of T.P. of 0.5 is an infinite boundary. At least part of this difference, between the numerical and experimental values, can be attributed to the fact that the theoretical model of equation (8) representing fluid flow is very approximate while the experimental results are closer to the representation of real flow.

Figure 4:
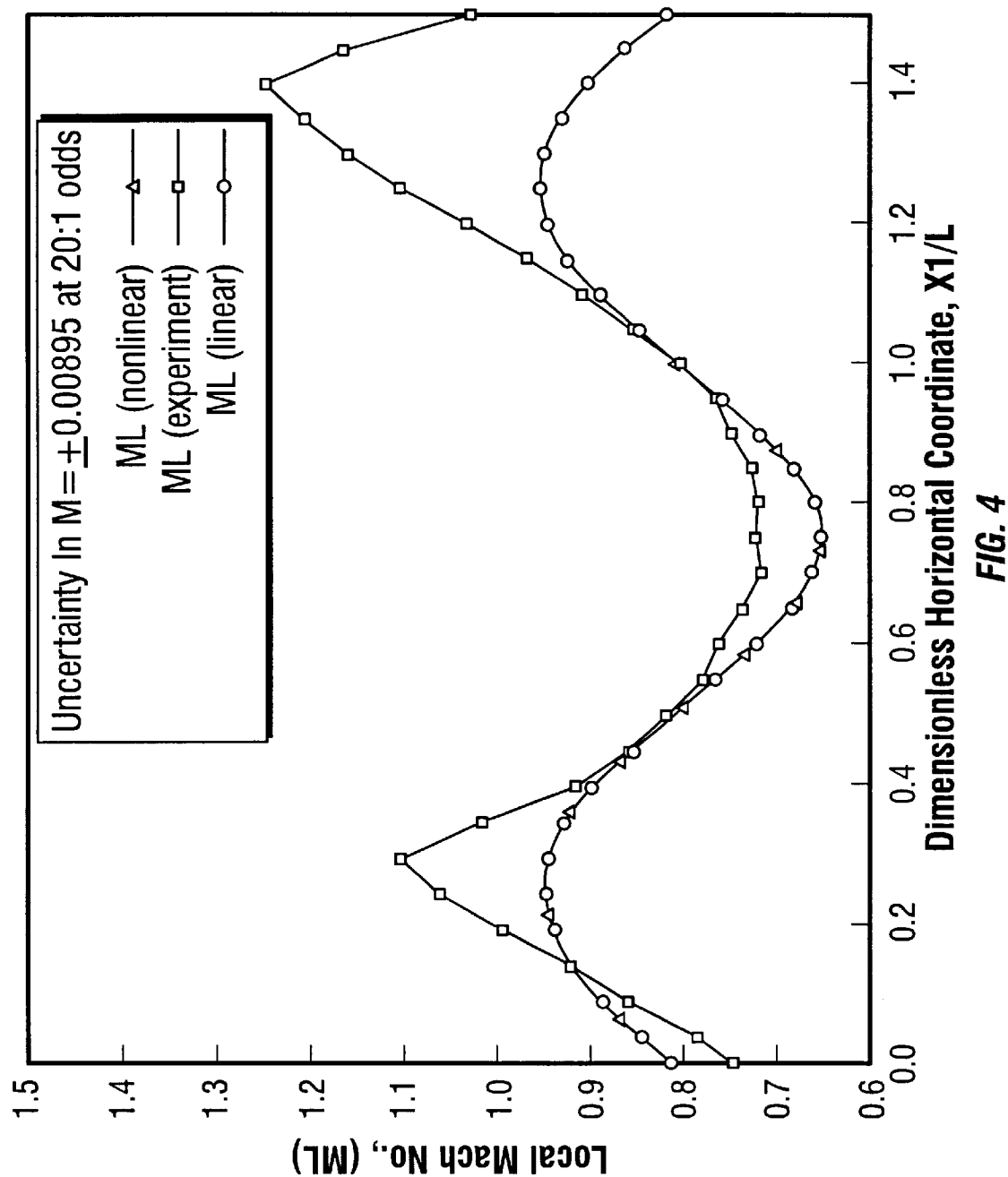
FIG. 4 is a plot of the local mach no. v. horizontal distance at T.P.=0.723.
Figure 5:
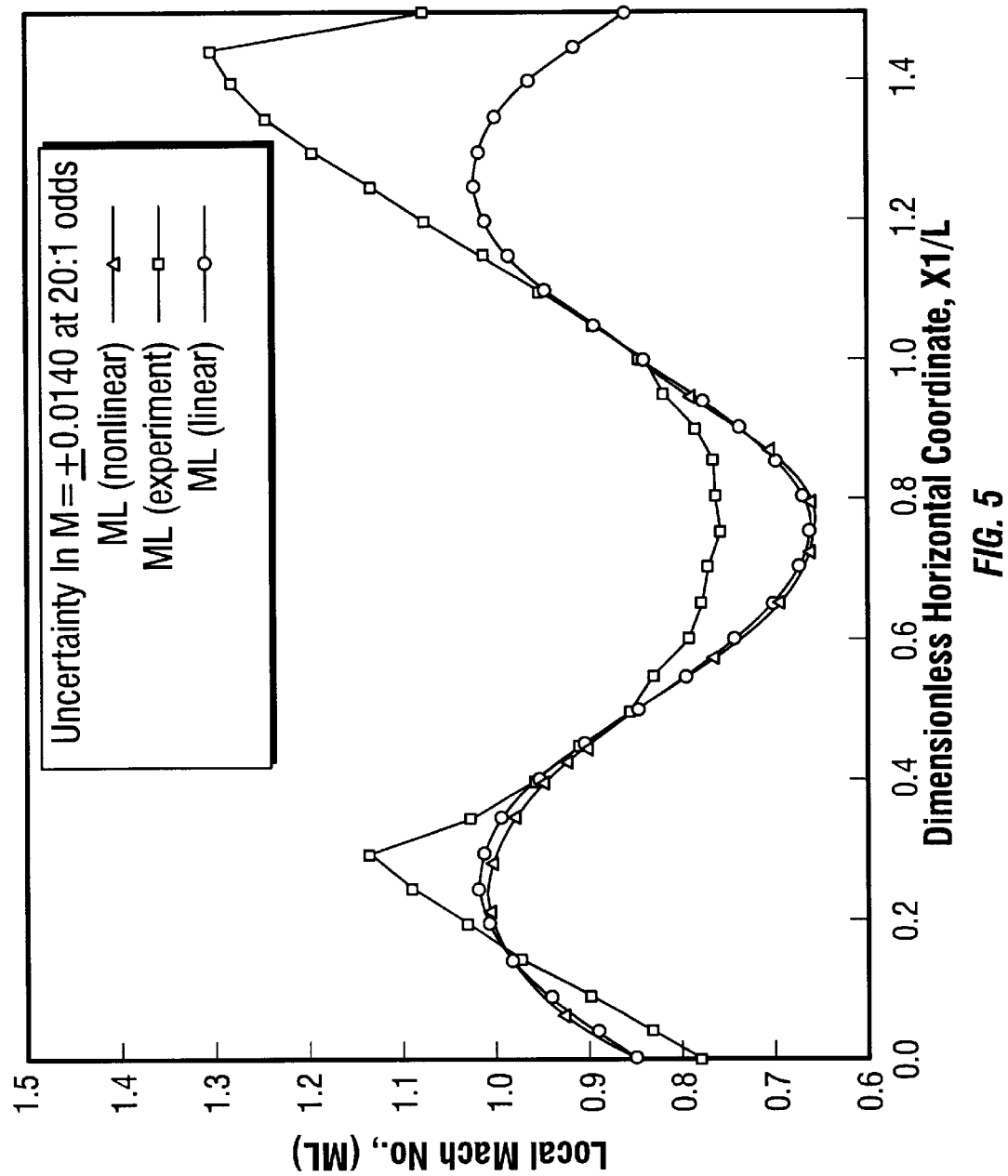
FIG. 5 is a plot of the local mach no. v. horizontal distance at T.P.=1.086.

The uncertainty in $M_\infty$ equal to 0.78573 corresponding to T.P. value of 0.6363 is computed from the uncertainty values of FIGS. 12, 13 and 4 and by using the quadratic formula for uncertainty:

uncertainty=$b_1+b_2\ M\infty+b_3M^2_\infty$ where $M\infty$ represents the corrected values of $M\infty$ for FIGS. 12, 13 and 4. The value of uncertainty turns out to be ±0.00791. This uncertainty in the value of $M\infty$ for obtaining locally sonic flow corresponds to an uncertainty in the value of T.P. of 0.6363 in the range of −0.0418 to ±0.0560.

Beauchamp's value of transonic parameter for sonic flow is less than 0.897 while Chang's value is 0.745. It is interesting to note that all of these values are less than one, which is the classical value.

The peak of the experimental results for local Mach numbers in FIG. 4 shows a shift relative to the peak of linear flow. This shift would be typical of a supersonic flow. The shift of the peak of the numerical results is delayed until T.P. value of 4.596 due to the satisfaction of only the approximate boundary conditions. Peak shift does not take place in Chang until after a T.P. value of 1.086.

There is a definite tendency towards a fluctuating flow pattern in the concavity of the boundary in the local values of Mach number with increasing values of transonic parameter. This observation of the fluctuating flow behavior in the analytical solution for the first time motivated some of the experimental work presented herein. Both the experimental and the numerical results show a remarkable similarity although the local values are different. This behavior is not seen in Beauchamp and Chang due to the necessity of having to use smoothing schemes to get their numerical solution. It can be seen in Tale 1 of FIG. 3 that, in every instance, the experimental value of local Mach number is different (higher) on the upstream side than on the downstream side at the corresponding $x_2$ location. At lower values of T.P., this difference can be explained by inertia effects and boundary layer growth. With increasing values of T.P., where fluctuating behavior is more predominant, a greater shift in peak should cause an increasing difference in the local Mach values because of the increase of non-symmetry of flow. However, it is interesting to observe the values of the Mach number differences of the corresponding tap locations on the left and the right side of the concavity. For lower T.P. values, these differences first increase and then decrease, but for higher T.P. values these differences alternately increase and then decrease. These two different difference patterns should eliminate imperfections in the machining of the boundary as the major reason for the fluctuating behavior. The uncertainty in the values of the Mach numbers also cannot account for this variation of differences in magnitudes of M as these are, in general, greater than the uncertainty values.

It is interesting to note that the maximum difference in values of axial velocity (in the concavity) between $u_{nonlinear}$ and $u_{linear}$ can be large; for example, for the T.P. value of 6.581 this difference of magnitude is 223% of the linear axial velocity at $x_1$ equal to 5.771 meters, while for T.P. equal to 18.427 this difference of magnitude is 30% of the linear axial velocity at $x_1$ equal to 4.884 meters. This speeding up and slowing down of the axial flow in the concavity due to the presence of fluctuating behavior may enhance mixing of the fuel with air if fuel were to be introduced in the concavity.

The values of Mach numbers in Table I of FIG. 3 indicate that the pressures at the downstream boundary are higher than at the upstream boundary at the corresponding locations (i.e., at the same values of $x_2$). This pressure difference increases with increasing values of T.P. One explanation for the fluctuating behavior may be that the concavity of the boundary forms a confined region and therefore provides a direct path for propagation of pressure disturbances caused by inequality of pressures at corresponding stations, from the left boundary of the concavity which influences the flow over the right boundary of the concavity and vice versa. There is no such direct path available to the pressure disturbances due to the nonsymmetry of the Mach number distribution in the convex portion of the boundary (as the disturbances cannot travel through the solid boundary). The influence of the left side of the convex boundary on the right side, and vice versa, is therefore indirect and consequently no such fluctuating behavior is observed over the convex portion of the boundary.

Figure 15:
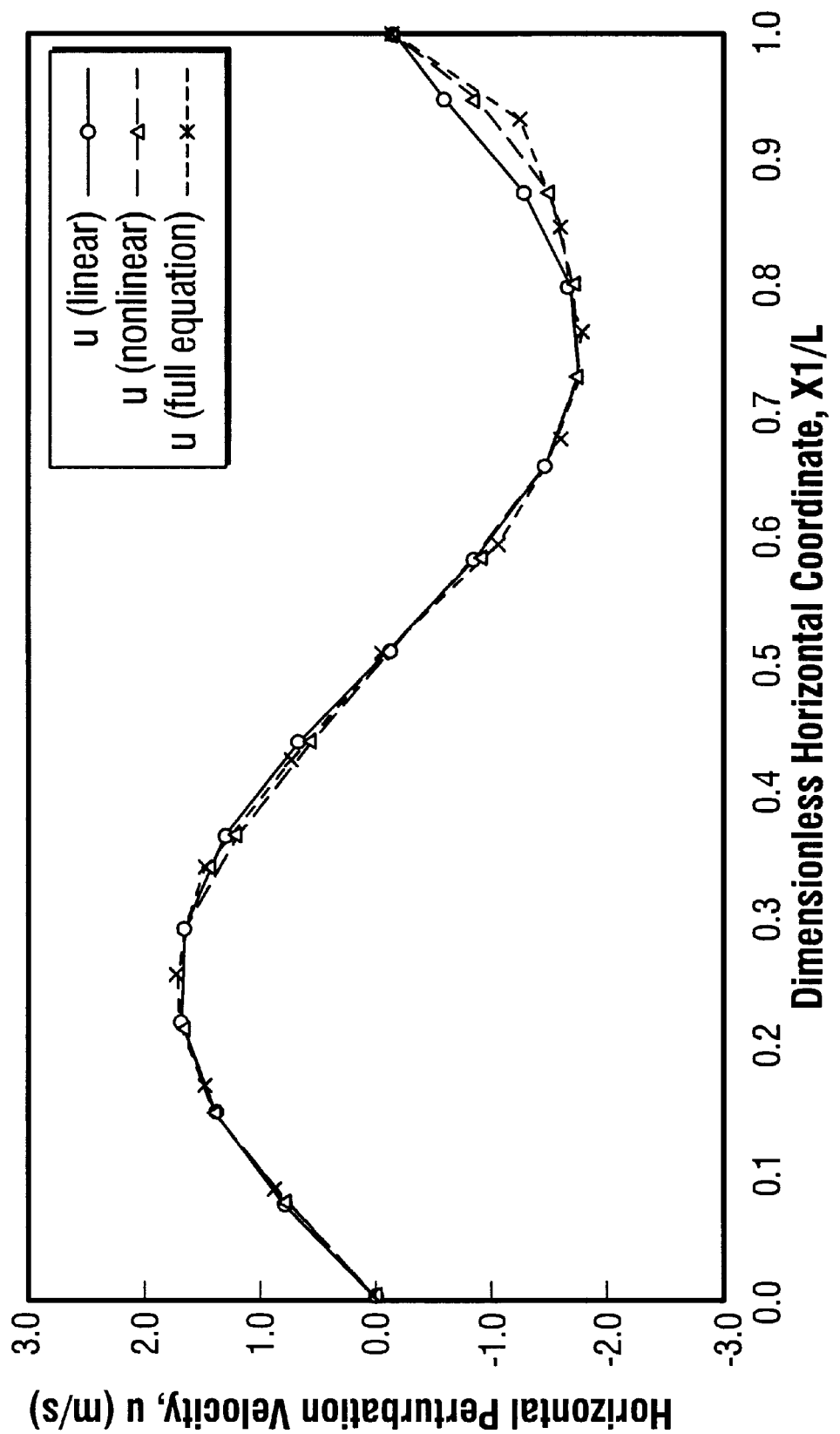
FIG. 15 is a plot of local horizontal perturbation velocity v. horizontal distance at T.P.=0.2.972.

FIG. 15 shows a solution of the linear equation, the equation number (8) and the complete potential flow equation in perturbation from without dropping any of the terms. In the complete equation, the linear terms were multiplied by $Z^2$ and the second order terms were multiplied by Z.

Thus, locally sonic flows begin at transonic parameter values greater than 0.5 for infinitely long boundaries while the experimental value for a finite sine boundary is 0.6363.

The new method developed to solve differential equations may not be utilized unless a linearized solution is available. Whenever practical, solutions generated by this method may turn out to be superior to numerical methods. In this particular case, this newly discovered fluctuating flow phenomenon in the boundary concavity may prove to be useful for enhancing combustion in the jet engines.

A number of embodiments of the present invention have been described. Nevertheless, it will be understood that various modifications may be made without departing from the spirit and scope of the invention. Accordingly, other embodiments are within the scope of the following claims.

What is claimed is:

1. A fuel/air mixing device for a gas turbine engine having an air intake:
   an air-foil surface generally in the form of a linear combination of sinusoidals mounted in the air intake of the engine;
   means for introducing fuel adjacent said surface; and
   means for increasing the velocity of air over said surface substantially to the speed of sound.

2. The fuel/air mixing device of claim 1 wherein the gas turbine engine is encased in a generally cylindrical housing and the air intake to the turbine is defined by a tapered internal cylindrical surface; and
   wherein said air-foil surface is formed on a generally cylindrical drum mounted within the air intake.

3. The fuel/air mixing device of claim 2 wherein said air-foil surface is formed on the outer cylindrical surface of said drum and takes the form of a linear combination of sinusoidals extending throughout its axial length.

4. The fuel/air mixing device of claim 3 wherein said drum surface has a tapered leading edge and is effective to define a verturi structure with respect to the air intake surface of the housing, whereby air passing between said air intake surface and said drum is caused to increase in velocity substantially to the speed of sound.

* * * * *